United States Patent [19]

Irwin et al.

[11] Patent Number: 4,859,815
[45] Date of Patent: Aug. 22, 1989

[54] SERIAL LINK TRANSPARENT MODE DISPARITY CONTROL

[75] Inventors: John W. Irwin, Austin; James D. Wagoner, Georgetown, both of Tex.

[73] Assignee: International Business Machines Corporation, Armonk, N.Y.

[21] Appl. No.: 285,921

[22] Filed: Dec. 19, 1988

[51] Int. Cl.$^4$ .......................... H04L 1/10; H04L 25/49
[52] U.S. Cl. .................................... 178/69 D; 371/52; 375/19
[58] Field of Search ............. 178/69 D, 69 N; 371/52, 371/55, 56, 57; 375/19

[56] References Cited

U.S. PATENT DOCUMENTS 4,486,739 12/1984 Franaszek et al. .
4,620,311 10/1986 Schouhamerlmmink .............. 371/56

Primary Examiner—Stafford D. Schreyer
Attorney, Agent, or Firm—Douglas H. Lefeve

[57] ABSTRACT

In a serial link in which it is necessary to occupy the link before and after transmission of a frame by sending a succession idle characters having alternating disparity effects, the disparity effect of the last character in the frame is compared with the disparity effect that would be produced by a disparity flip-flop, which has continued to step during frame transmission. If the disparity effect of these two characters match, no corrective action is required in order to resume the stream of idle characters. If the disparity effect of these characters differ, the disparity flip-flop is corrected before the stream of idle characters is resumed. Disclosed is hardware logic to accomplish this disparity control following transmission of frames in a transparent mode.

13 Claims, 3 Drawing Sheets

SERIAL LINK TRANSPARENT MODE DISPARITY CONTROL

TECHNICAL FIELD

This invention is generally related to the transmission of digital data over serial links and more particularly to a technique for controlling disparity of the link when transmitting data in a transparent mode.

BACKGROUND ART

The present invention provides a valuable solution to problems which may occur in the transmission of data on a balanced serial link. The serial link may be a fiber optic link or may be comprised of conventional copper conductors. In the transmission of digital information over such a link, it is common to use 10 bit link characters to represent bytes of data and pairs of special 10 bit characters for continuous transmission sequences such as "idle" characters.

The balance of such a serial link is described by the term "disparity" which defines the degree of unbalance of the link from neutral or zero. In a typical serial link, acceptable disparity states of the link are +1 and −1. Accordingly, the disparity effect of legal 10 bit link characters is either zero, +2 or −2. Thus, if the link is in a state of −1, a +2 link character will change the link to a state of +1 and vice versa. Obviously a character having a disparity effect of zero will not change the state of the link. To achieve this, each of the possible data bytes must be represented either by a single link character having zero disparity effect or by two characters; one character with a disparity of +2 and one character with a disparity of −2.

Each continuous link sequence is represented by both +2 and −2 disparity characters used alternately. The link may be always initialized in the same state when powered on (for example +1) and the serial link logic then maintains disparity on the link within the +1 and −1 limits by choosing the appropriate representation of each byte or continuous sequence. The operation of the logic to maintain this disparity, including the choice of the appropriate alternative representation of each byte or continuous sequence, is accomplished in a normal or non-transparent mode of operation wherein the digital information to be transmitted is examined during the transmission process to allow for the appropriate representations thereof to be serialized and transmitted.

Typically there are two different types of digital information that are transmitted in this non-transparent mode of operation: (1) a data frame and (2) a link level frame. A data frame is simply a frame of data, typically generated by use of an application program, such as a word of text or control code from a word processing program or information from a cell of a spreadsheet program or a field, record, or collection of records from a database program, as the case may be. A link level frame may typically contain a message associated with the operation of the serial link and is used to convey operational information from one point on the link to another point on the link. This operational information may be messages to operators of the system or may be information needed by the hardware to maintain appropriate link operation. In either case, these link level frames are defined during design and implementation of the system. Thus, there is a finite number of these frames. Additional link level frames cannot be provided without hardware additions.

The present invention is necessary because it is desirable to transmit preformatted link sequences without introducing random disparity errors during the insertion of the preformatted sequence into the link character stream. Such preformatted link sequences may be additional link level frames, diagnostic frames containing intentional errors, or non-frame link test test sequences. For example, it may be desirable to send a test block of data in which the disparity of the link intentionally exceeds the acceptable limits for the purpose of testing the disparity checking circuitry in the receiving channel. In order that the results of such a test be predictable, it is imperative that no random disparity errors be introduced when transmitting the sequence. The transmission of this type of data requires a transparent mode of operation which bypasses the hardware normally used for encoding the character data of data frames or the special sequences of link level frames. Because this hardware is also the facility that generates the idle characters between transmissions, the bypassing of this hardware also loses the ability to insure that the first idle character following a transparent mode transmission has a disparity effect that is opposite to the last character in the transparent block.

It would therefore, be greatly advantageous in a serial link communication system to convey digital information in a transparent mode while maintaining correct disparity on the serial link.

SUMMARY OF THE INVENTION

Accordingly, at the end of the transmission of a frame in a transparent mode, it is necessary to occupy a serial link by immediately sending a succession of idle characters having alternating disparity effects. Idle characters of alternating disparity are continually generated concurrently with the sending of the characters of the frame, but these idle characters are not sent during transmission of the frame. As the last character in the frame is sent to a serializer, its disparity effect is compared with the disparity effect of the concurrently generated idle character. If the disparity effect of those two characters match, then the next idle character will have the opposite disparity effect, and it is the first idle character sent to the serializer following transmission of the frame sent in the transparent mode. If the disparity effect of the idle character that is generated concurrently with the transmission of the last character in the frame is not equal to that of the last character in the frame, then the idle character generator is advanced ahead by one character so that the first idle character that is sent to the serializer has a disparity effect opposite to that of the last character in the frame that was transmitted in the transparent mode.

The foregoing and other objects, features, extensions, and advantages of the invention will be apparent from the following more particular description of preferred embodiments of the invention as illustrated in the accompanying drawings.

DESCRIPTION OF THE PREFERRED EMBODIMENTS

Figure 1:
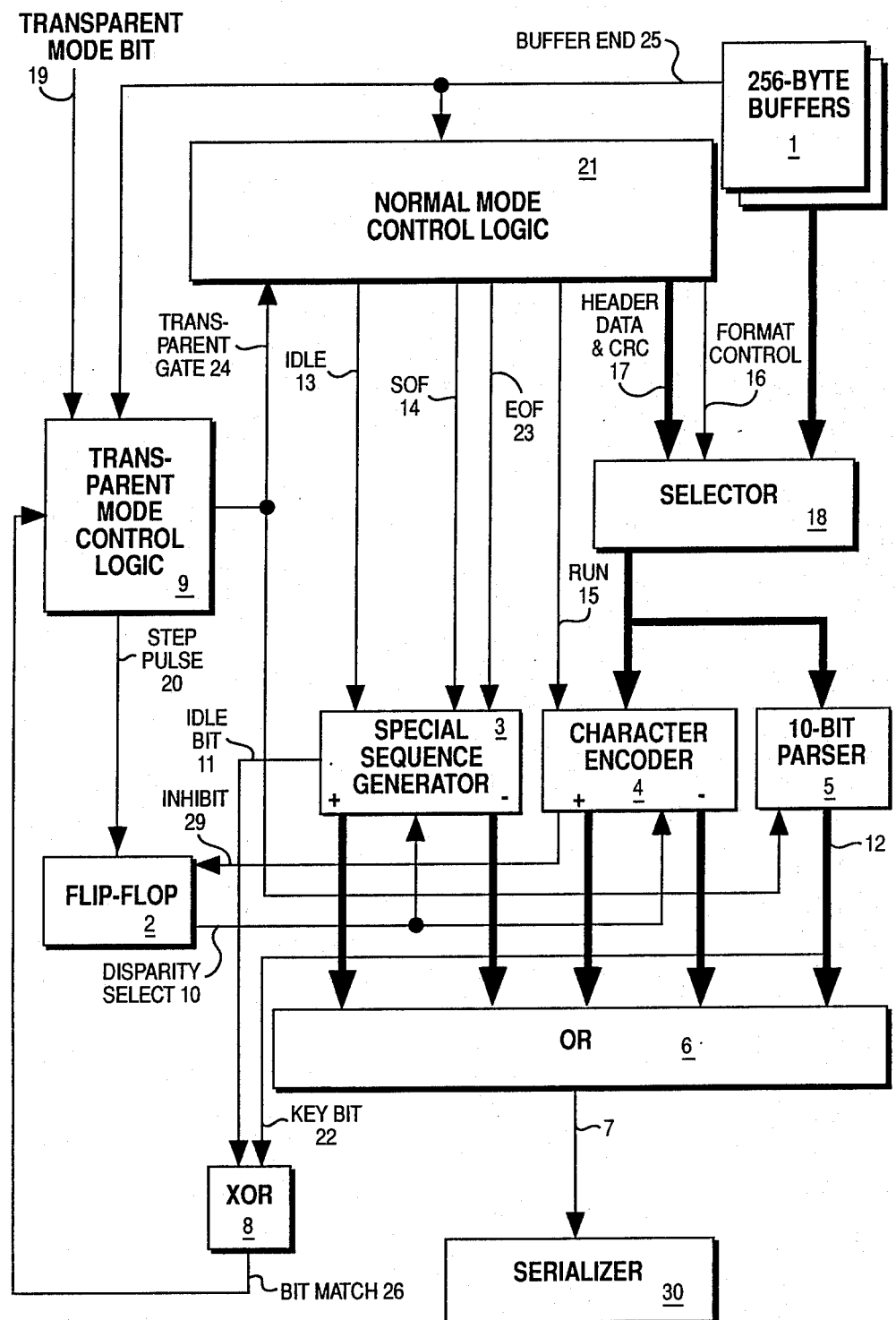
FIG. 1 is a system logic diagram of a link transmitter which incorporates logic for transmission of binary information in both non-transparent and transparent modes.
Figure 2:
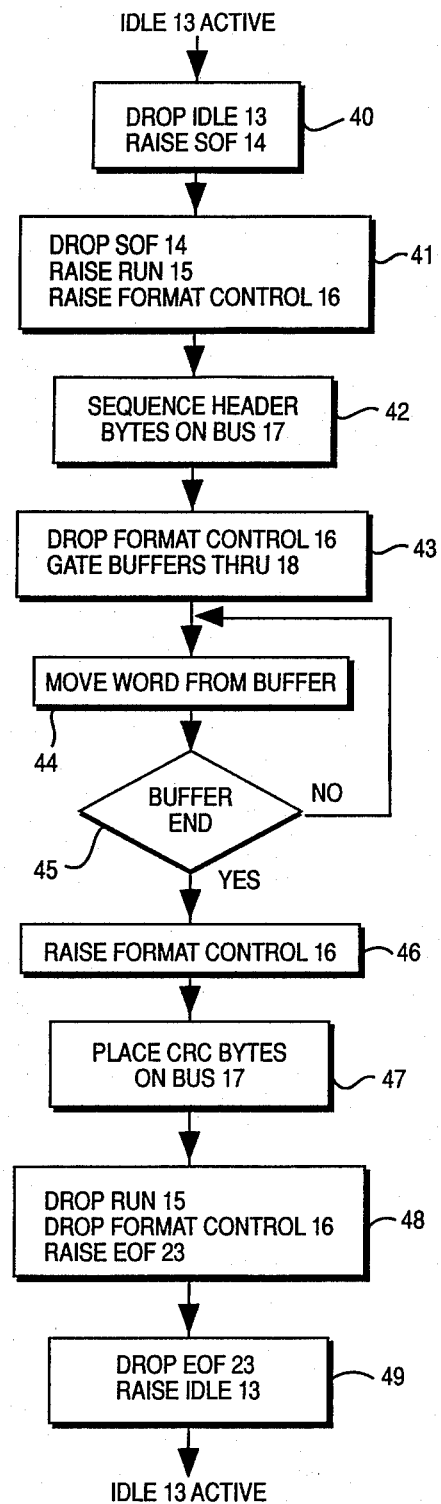
FIG. 2 is a flow chart which shows the operation of the normal mode control logic 21.

Referring now to FIGS. 1 and 2, the normal, or non-transparent mode of operation is first described. FIG. 1 includes the portion of the serial channel logic that assembles the parallel data input to a serializer 30 associated with a serial link. The control portions of this logic include normal mode control logic 21 and transparent mode control logic 9. FIG. 2 depicts the operation of the normal mode control logic 21.

In FIG. 1 it is an object of this operation to transfer a data frame, the data of which is in one or more 256 byte buffers 1, to the serializer 30 of the serial link. The normal mode control logic 21 provides all of the sequencing required to provide data frames to the serializer 30.

Figure 5:
FIG. 5 shows the format of the data frame constructed by this invention.

A sample of such a data frame is shown in FIG. 5. These data frames begin with a start of frame character which is generated by a special sequence generator 3 in response to a start of frame (SOF) signal conveyed on line 14 from the normal mode control logic 21. Next in the data frame is a header, which is generated by the normal mode control logic and conveyed through bus 17. Thereafter in the data frame are data blocks from the buffers 1. Following the data from buffers 1 is a cyclic redundancy check (CRC) byte generated by the normal mode control logic 21 and conveyed on bus 17 and, finally, an end of file (EOF) character generated by the special sequence generator 3 in response to an EOF signal on line 23 from the normal mode control logic 21.

Disparity control in the normal mode is centered in a flip-flop 2 which outputs disparity select line 10. Disparity select line 10 specifies to the special sequence generator 3 and a character encoder 4 whether the special sequence or character to be conveyed through an OR 6 along bus 7 to the serializer 30 is to be encoded with a +2 or a -2 disparity effect.

The special sequence generator 3 creates continuous link character sequences such as the idle character, and produces both the +2 and -2 disparity version of the current special link character. The character encoder 4 likewise produces both the +2 and -2 disparity version of the current link character. Some link characters have zero disparity effect. For these characters, the change of state of flip-flop 2 is inhibited by character encoder 4 by raising the inhibit line 29 for one cycle.

In FIG. 2, and with reference to FIGS. 1 and 5, the normal operation before frame transmission is to have the idle line 13 raised, which signals the special sequence generator 3 to encode idle codes of alternating disparity and convey these codes through the OR gate 6, along bus 7, to the serializer 30. Then, at 40 the idle line 13 is dropped, which inhibits the further generation of idle characters, and the SOF line is raised from the normal mode control logic to the special sequence generator 3. This causes the SOF code to be generated and conveyed through the OR gate 6 to the serializer 30.

At 41 the SOF line is dropped and the run line 15 from the normal mode control logic 21 is raised to the character encoder 4. The format control line 16 from control logic 21 is also raised at this time. This line controls a data selector 18 which determines the path through which data flows to the character encoder 4 (and to the 10 bit parser 5, to be discussed hereinafter). The data selector 18, therefore, functions as a single pole, double throw switch. While the format control line 16 is raised, data flows from control logic 21 through selector 18 to the character encoder 4. When the format control line 18 is low, data flows from buffers 1 to the character encoder 4.

At 42 a sequence of header bytes is conveyed on bus 17 from control logic 21, through the selector 18, to the character encoder 4. The header data is encoded into 10 bit link characters and conveyed through OR gate 6 to the serializer 30. At 43 the format control line 16 is dropped, which will allow the data words from buffers 1 to be transferred through the selector 18 to the character encoder 4.

At 44 one word of data is transferred from buffers 1, through the selector 18, to the character encoder 4. In the normal mode, each 32 bit word of data is divided into four link characters, which link characters are then encoded by the character encoder 4 and transferred to the serializer 30 through OR gate 6.

At 45 a test is performed to determine whether the buffers 1 are empty of data words. If not, the operation loops back to 44 to allow another data word to be transferred for encoding. If so, all of the data words have been transferred and the remainder of the frame information, consisting of the CRC character and the EOF character must be encoded and transferred to the serializer. The operation then proceeds to 46, at which time the format control line 16 is raised.

At 47 the CRC bytes generated by the control logic 21 are transferred through selector 18 to the character encoder 4. These bytes are then encoded and transferred through OR gate 6 to the serializer 30. At 48, both the run line 15 and the format control line 16 are dropped. At the same time, the EOF line is raised to the special sequence generator 3, which allows this generation to produce the EOF character to be sent to the serializer 30.

At 49 the EOF line 23 is dropped and the idle line 13 is raised. This allows a succession of idle codes to be sent to the serializer 30 until some other frame is ready to be sent. Again, it should be understood that flip-flop 2 changes state regularly at each character boundary during normal frame transmission unless inhibited by inhibit line 29 for encoded characters with zero disparity effect. That is, in this normal, non-transparent mode disparity is maintained between +1 and -1 because the flip-flop 2 is synchronized with each character that is output from either the special sequence generator 3 or the character encoder 4 to cause each character that is output to have either the opposite disparity effect in comparison to the immediately preceding character which caused disparity or a zero disparity effect.

Figure 3:
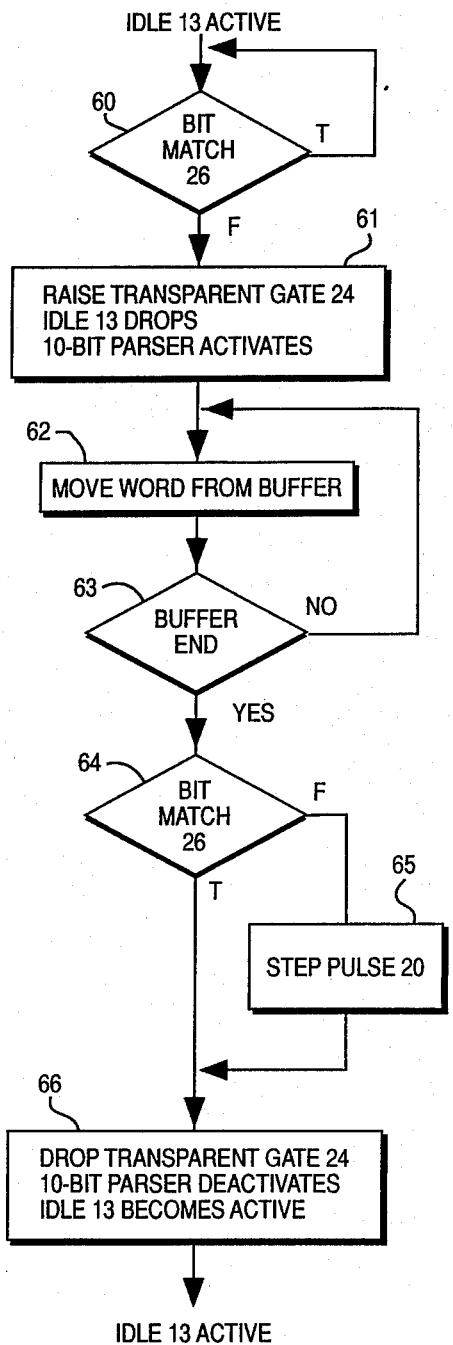
FIG. 3 is a flow chart which shows the operation of the transparent mode control logic 9.

A fundamental difference between transmission in the transparent mode and transmission in the non-transparent mode is that in the transparent mode the link characters are immediately serialized after being parsed from the 32 bit data words. Thus, the character encoder is not involved with insuring the appropriate choice of alternative character encoding having either +2 or -2 disparity effects. In the transparent mode this invention operates to transfer the data exactly as it is stored in buffers 1, without further disparity correction, which might otherwise alter the data is a disadvantageous manner. However, after such a transparent transmission is completed, this invention chooses the first idle character to be sent on the link to have a disparity effect opposite to that of the last transmitted character in the transparent mode. With reference now to FIGS. 1 and 3 the operation of the system in the transparent mode is described.

Figure 4:
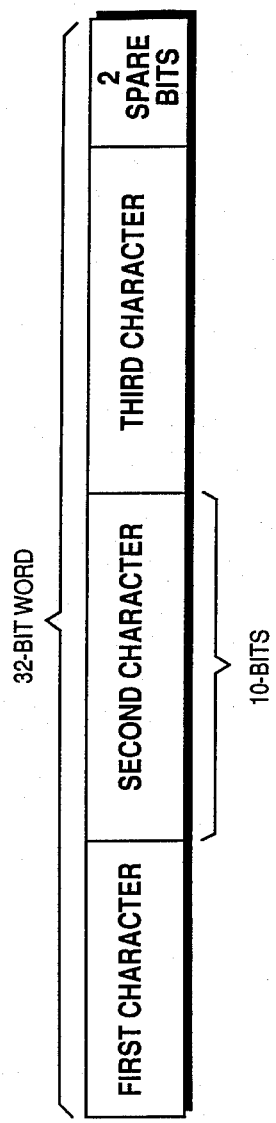
FIG. 4 shows the format of the 32 bit data words from which the link characters are obtained.

FIG. 4, applicable to the transparent mode, shows a representation of how a 32 bit data word, as stored in buffers 1, actually comprises three 10 bit words, as well as a pair of spare bits. The spare bits are normally the lowest order bits and are discarded. Those skilled in the art will recognize that the number of bits in each data word and in each link character can vary according to the designer's choice.

One or more 256 byte blocks of transparent mode data in buffers 1 has been encoded with a link image to be transmitted, which can be a test pattern or a special message not supported by the link hardware. This translation is constrained to begin with a link character that has +2 disparity. Transparent mode bit 19 is raised to initiate transparent mode transmission. This action enables the transparent mode control logic 9. Key bit 22 is low because a 10 bit parser 5 remains inactive. An exclusive OR (XOR) 8, therefore, passes idle bit 11 unchanged on bit match line 26. Idle bit 11 examines a particular bit position of the idle character, the value of which bit is indicative of the disparity value of the idle character presently queued for sending to OR gate 6 at the next clock cycle. Bit match line 26, then, can be used as an indicator of whether the current idle character being produced has a +2 or −2 disparity. Accordingly, at 60 a test is made to determine the level of the bit match line 26. A "true" at 60 indicates that the disparity value of the current idle character is +2, so the operation loops back to 60 to test the disparity value of the next idle character. This time a "false" result indicates that the disparity value of the then current idle character is −2 and the operation proceeds to 61 at which time a transparent gate line 24 is raised to disable the normal mode control logic 21. Disabling the normal mode control logic 21 drops the idle control line 13, which ceases the generation of further idle characters. Raising the transparent gate line 24 also enables the 10 bit parser 5, which has been disabled up to this time.

Since format control 16 is inactive, the contents of buffers 1 are gated through selector 18 to the 10 bit parser 5. Buffer data is loaded into 10 bit parser 5 in units of one word (32 bits) at a time and placed on bus 12 in units of 10 bits as shown in FIG. 4. The extra two bits of each data word are discarded. As shown at 62 and 63, as each data word is exhausted, another 32 bit word is loaded from buffers 1 until the entire transparent data block is exhausted. Note that the output of the flip-flop 2 does not affect the serializer input while parser 5 is active.

Although the disparity of the initial link character can be specified as a fixed disparity, the disparity of the final character cannot be fixed, as it is a function of the contents of the transparent frame which contains a mixture of characters having zero, +2 and −2 disparity effects and which might contain intentional disparity error patterns to test the link logic. It is possible, however, to set a constraint on the contents of the last 10 bit link character. The translation is constrained to end with either: (1) the last 10 bits containing either phase of an idle character or (2) the last 10 bits containing any character which shares a common attribute with idle characters in which a specific bit of the character predicts the disparity effect of that character.

When the last 10 bit group of the last 32 bit word of the transparent data block is reached, buffer end line 25 is raised to signal transparent mode control logic 9 to sample XOR 8 for a determination of the relationship of the disparity effect of the last link character and the disparity then being produced by the special sequence generator 3. If the bit match line 26 is inactive at 62, then the flip-flop 2 and the transparent data disparity are out of step. Gating in idle characters by raising the idle line 13 and lowering the transparent data gate line 12 would then cause a disparity error. To prevent this error, at 65 the transparent mode control logic 9 issues a pulse on step pulse line 20 to change the state of flip-flop 2. If the bit match line 26 is active at 62, then the flip-flop 2 and the transparent data disparity are in step and no synchronizing action is required. Then, at 66 the transparent mode control logic 9 lowers the transparent gate line 24. This reactivates the normal mode control logic 21 and deactivates the parser 5. The idle line 13 is raised at this time to allow idle characters to be gated through OR gate 6 to the serializer 30. The transition from transparent to idle characters is thus effected without inducing a disparity error.

In summary a disparity control technique has been described for use in a serial link in which it is necessary to occupy the link before and after transmission of a frame by sending a succession idle characters having alternating disparity effects. The disparity effect of the last character in the frame is compared with the disparity effect that would be produced by a disparity flip-flop, which has continued to step during frame transmission. If the disparity effect of these two characters match, no corrective action is required in order to switch in the stream of idle characters. If the disparity effect of these characters differ, the disparity flip-flop is corrected before the stream of idle characters is resumed.

While the invention has been shown and described with reference to particular embodiments thereof, it will be understood by those skilled in the art that the foregoing and other changes in form and details may be made therein without departing from the spirit and scope of the invention.

We claim:

1. In a link transmitter for sending a frame of link characters in a transparent mode, the improved method for disparity control comprising:
    examining the disparity effect of a last link character in said frame; and
    sending a first idle character thereafter encoded with an opposite disparity effect from said disparity effect of said last link character.

2. The method of claim 1, wherein said step of examining further comprises:
    examining said disparity effect of said last link character in said frame when said last character is sent to a serializer.

3. The method of claim 2, wherein said step of sending further comprises:
    generating a succession of idle characters while sending at least some of said link characters.

4. The method of claim 3, wherein said step of generating further comprises generating said succession of idle characters in synchronism with the transmission of said link characters.

5. The method of claim 4, wherein said step of sending further comprises:

comparing said disparity effect of said last link character with the disparity effect of an idle character that is generated concurrently with the transmission of said last link character that is transmitted in said frame.

6. The method of claim 5, wherein said step of sending further comprises:

advancing the generation of a next idle character, which immediately succeeds said idle character that is generated concurrently with said transmission of said last link character that is transmitted in said frame, when the disparity effect of said last link character is not equal to the disparity effect of said idle character which is generated concurrently with the transmission of said last link character.

7. The method of claim 6, wherein said step of sending further comprises:

sending said next idle character to said serializer immediately following said last character.

8. In a link transmitter system for sending a frame of link characters in a transparent mode, the improvement for disparity control comprising:

means for examining the disparity effect of a last link character in said frame when said last character is sent to a serializer; and means for sending a first idle character thereafter encoded with an opposite disparity effect from said disparity effect of said last link character.

9. The system of claim 8, wherein said means for sending further comprises:

means for generating a succession of idle characters in synchronism with sending said link characters.

10. The system of claim 9, wherein said means for sending further comprises:

means for comparing said disparity effect of said last link character with the disparity effect of an idle character that is generated concurrently with the transmission of said last link character that is transmitted in said frame.

11. The system of claim 10, wherein said means for comparing further comprises an exclusive OR circuit.

12. The system of claim 11, wherein said means for sending further comprises:

means for advancing the generation of a next idle character, which immediately succeeds said idle character that is generated concurrently with said transmission of said last link character that is transmitted in said frame, when the disparity effect of said last link character is not equal to the disparity effect of said idle character which is generated concurrently with the transmission of said last link character.

13. The system of claim 12, wherein said means for sending further comprises:

means for sending said next idle character to said serializer immediately following said last character.

* * * * *